United States Patent
Noguchi

(10) Patent No.: US 9,575,711 B2
(45) Date of Patent: Feb. 21, 2017

(54) DISPLAY APPARATUS, MULTI-IMAGE DISPLAY SYSTEM, AND DISPLAY CONTROL METHOD

(75) Inventor: Toshiyuki Noguchi, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 3 days.

(21) Appl. No.: 14/408,926

(22) PCT Filed: Jun. 26, 2012

(86) PCT No.: PCT/JP2012/066293
§ 371 (c)(1),
(2), (4) Date: Dec. 17, 2014

(87) PCT Pub. No.: WO2014/002197
PCT Pub. Date: Jan. 3, 2014

(65) Prior Publication Data
US 2015/0193188 A1    Jul. 9, 2015

(51) Int. Cl.
*G06F 3/14* (2006.01)
*G09G 3/20* (2006.01)
*G09G 3/36* (2006.01)

(52) U.S. Cl.
CPC ........... *G06F 3/1446* (2013.01); *G09G 3/2085* (2013.01); *G09G 3/36* (2013.01); *G09G 2340/0464* (2013.01); *G09G 2340/14* (2013.01)

(58) Field of Classification Search
CPC ............. G06F 3/1446; G09G 2340/0464; G09G 2340/14; G09G 3/2085
See application file for complete search history.

(56) References Cited

U.S. PATENT DOCUMENTS 8,395,703 B2 * 3/2013 Miyasaka ............ G09G 3/2022
                                                          348/500
8,963,798 B2 * 2/2015 Lee ....................... G06F 3/1438
                                                          345/1.1
(Continued)

FOREIGN PATENT DOCUMENTS

JP       53-116730 A      10/1978
JP       03-114373 A       5/1991
(Continued)

OTHER PUBLICATIONS

International Search Report (ISR) (PCT Form PCT/ISA/210), in PCT/JP2012/066293, dated Oct. 2, 2012.

*Primary Examiner* — Afroza Chowdhury
(74) *Attorney, Agent, or Firm* — McGinn IP Law Group, PLLC.

(57) ABSTRACT

Each of liquid crystal display apparatuses (10), forming a multi-image display system, includes an image signal processing part (2) which determines a write speed of an image signal based on the number of liquid crystal display apparatuses (10) being aligned in a vertical direction with respect to the lines of an image display device (3) in the multi-image display system. Additionally, the image signal processing part (2) shifts write start timing of the image signal display device (3) based on the location of the corresponding apparatus within the liquid crystal display apparatuses (10) being aligned in the vertical direction with respect to the lines, thus displaying a display image of the corresponding apparatus in the image display device (3) at the determined write speed.

14 Claims, 8 Drawing Sheets

(56) References Cited

U.S. PATENT DOCUMENTS

| | | | | |
|---|---|---|---|---|
| 2010/0020237 A1* | 1/2010 | Miyasaka | ............ | G09G 3/2022 |
| | | | | 348/563 |
| 2011/0242412 A1* | 10/2011 | Lee | ..................... | G06F 3/1438 |
| | | | | 348/500 |
| 2012/0162286 A1* | 6/2012 | Toyotaka | ............... | G09G 3/003 |
| | | | | 345/690 |

FOREIGN PATENT DOCUMENTS

| JP | 5-341739 A | 12/1993 |
|---|---|---|
| JP | 2008-216436 A | 9/2008 |
| JP | 2009-282433 A | 12/2009 |

* cited by examiner

DISPLAY APPARATUS, MULTI-IMAGE DISPLAY SYSTEM, AND DISPLAY CONTROL METHOD

TECHNICAL FIELD

The present invention relates to a display apparatus, a multi-image display system, and a display control method.

BACKGROUND ART

Recently, liquid crystal display devices included in liquid crystal display apparatuses have been reduced in terms of the size of frames. Accordingly, multi-image display systems horizontally and vertically aligning a plurality of liquid crystal display apparatuses have been used as large screen display means.

Patent Literature Document 1 discloses a full screen display mode of a liquid crystal display apparatus in which a liquid crystal panel is horizontally and vertically divided into display areas so as to display images separately in the divided display areas.

CITATION LIST

Patent Literature Document

Patent Literature Document 1: Japanese Patent Application Publication No. 2008-216436

SUMMARY OF INVENTION

Technical Problem

FIG. 7 shows an example of an image displayed in the conventional multi-image display system using four liquid crystal display devices 90. When a moving image is displayed using the multi-image display system, as shown in FIG. 7, displacements of an image occur between the upper and lower liquid crystal display apparatuses. The principle regarding the occurrence of displacements of images will be described with reference to FIG. 8.

FIG. 8 shows an example of displaying video signals at the equal magnification with the liquid crystal display apparatuses 90 vertically disposed in two stages. Each liquid crystal display apparatus 90 is equipped with a liquid crystal display device forming 1,080 lines, wherein the upper-stage liquid crystal display apparatus is referred to as a liquid crystal display apparatus 90a while the lower-stage liquid crystal display apparatus will be referred to as a liquid crystal display apparatus 90b. The same video signal is input to both the liquid crystal display apparatus 90a and the liquid crystal display apparatus 90b. Each of the two liquid crystal display apparatuses 90a, 90b is designed to display each frame of image based on the input image signal in such a way that lines starting with the upper area are sequentially written into each liquid crystal display device.

In FIG. 8, reference sign 91a denotes a write operation to write an image into a lower line of frame (n−1) in the liquid crystal display device of the liquid crystal display apparatus 90a while reference sign 91b denotes a write operation to write an image into a lower line of frame (n−1) in the liquid crystal display device of the liquid crystal display apparatus 90b. Additionally, reference sign 92a denotes a write operation to write an image into an upper line of frame n in the liquid crystal display device of the liquid crystal display apparatus 90a while reference sign 92b denotes a write operation to write an image into an upper line of frame n in the liquid crystal display device of the liquid crystal display apparatus 90b.

In the liquid crystal display apparatuses 90a, 90b equipped with the liquid crystal display devices serving as hold-type devices, even when a write operation regarding the frame n is started at the timing of reference sign 92a of the liquid crystal display apparatus 90a and the timing of reference sign 92b of the liquid crystal display apparatus 90b, an image of frame (n−1) has been still displayed at the position of reference sign 91a of the liquid crystal display apparatus 90a and the position of reference sign 91b of the liquid crystal display apparatus 90b. For this reason, as shown by reference sign 93a, an image of frame (n−1) written in line 1,080 of the liquid crystal display device of the liquid crystal display apparatus 90a has been held until the end of a write operation of writing an image of frame n. As shown by reference sign 93b, an image of frame n which is written into the first line of the liquid crystal display device of the liquid crystal display apparatus 90b just after an image is written into line 1,080 of the liquid crystal display device of the liquid crystal display device 90a has been held until the end of a write operation of writing an image of frame n. Due to the above display operation, users may recognize displacements of images occurring between the liquid crystal display apparatus 90a and the liquid crystal display apparatus 90b due to the integral effect of the human eye. When displaying an image of a vertical line being moved right or left, for example, a line of reference sign 92a displayed in the upper-stage liquid crystal display apparatus 90a is displaced from a line of reference sign 91b displayed in the lower-stage liquid crystal display apparatus 90b. As shown in FIG. 8, the above displacement may occur similarly when a moving image is enlarged and displayed on the full screen of the multi-image display system.

Patent Literature Document 1 discloses that an image signal is displayed on the full screen of a liquid crystal display apparatus which can display images with dividing a liquid crystal panel, and therefore this technology cannot prevent images from being displaced in a multi-image display system using a plurality of liquid crystal display apparatuses.

The present invention is created in consideration of the aforementioned circumstances and aims to provide a display apparatus, a multi-image display system, and a display control method, thus carrying out a multi-image display operation while preventing displacements of moving images displayed on screen.

Solution to Problem

[1] The present invention is directed to a display apparatus forming a multi-image display system, which is characterized by comprising: a display part having a plurality of lines, which writes and displays an image via lines; a control part which determines a write speed of an image signal based on the number of display apparatuses aligned in a vertical direction with respect to the lines forming the display part in the multi-image display system; and an image signal processing part which shifts the write start timing based on the location of the corresponding apparatus within display apparatuses being aligned in a vertical direction so as to display a display image of the corresponding apparatus, being read from an image signal, on the display part.

[2] The present invention is directed to a multi-image display system including a plurality of display apparatuses, wherein each of the display apparatuses includes a display part having a plurality of lines which writes and displays an image via lines; a control part which determines a write speed of an image signal based on the number of display apparatuses being aligned in a vertical direction with respect to the lines forming the display part in the multi-image display system; and an image signal processing part which shifts the write start timing based on the location of the corresponding apparatus within display apparatuses being aligned in a vertical direction so as to display a display image of the corresponding apparatus, being read from an image signal, on the display part at the write speed.

[3] The present invention is directed to a display control method for a display apparatus having a display part, used to write an image via a plurality of lines, and forming a multi-image display system, which is characterized by comprising: a speed determination step configured to determine a write speed of an image signal based on the number of display apparatuses being aligned in a vertical direction with respect to the lines forming the display part in the multi-image display system; and a write process step configured to shift the write start timing based on the location of the corresponding apparatus within display apparatuses being aligned in a vertical direction so as to display a display image of the corresponding apparatus, being read from an image signal, on the display part at the write speed determined by the speed determination step.

[4] The present invention is directed to a display control method for a multi-image display system including a plurality of display apparatuses each equipped with a display part which writes and displays an image via a plurality of lines, wherein each of the display apparatuses implements a speed determination step configured to determine a write speed of an image signal based on the number of display apparatuses being aligned in a vertical direction with respect to the lines forming the display part in the multi-image display system, and a write process step configured to shift the write start timing based on the location of the corresponding apparatus within display apparatuses being aligned in a vertical direction so as to display a display image of the corresponding apparatus, being read from an image signal, on the display part at the write speed determined by the speed determination step.

Advantageous Effects of Invention

According to the present invention, it is possible to prevent displacements of moving images between display apparatuses in a multi-image display system carrying out a multi-image display operation using a plurality of display apparatuses.

DESCRIPTION OF EMBODIMENTS

Hereinafter, the embodiments of the present invention will be described with reference to the drawings.

[First Embodiment]

Figure 1:
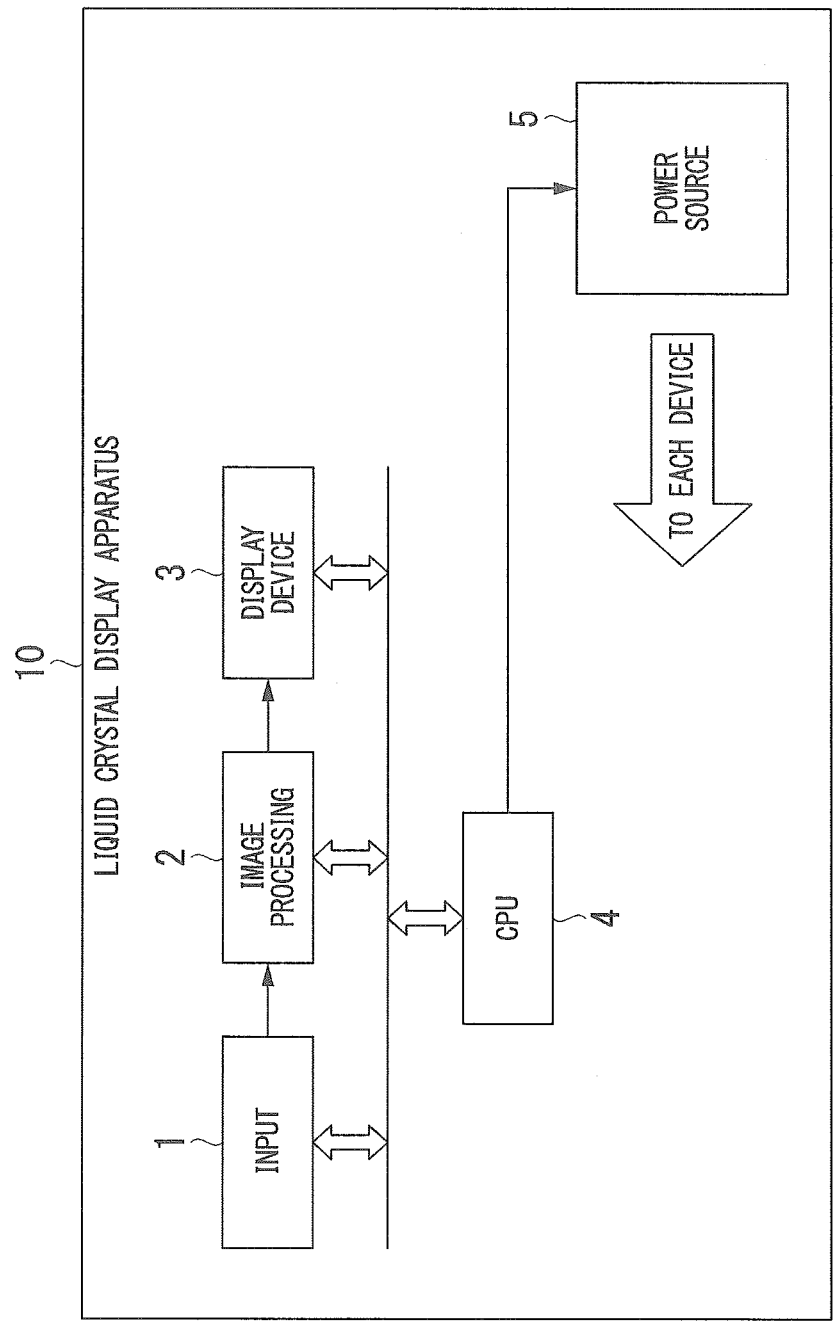
FIG. 1 is functional block diagram of a liquid crystal display apparatus according to the first embodiment of the present invention.

FIG. 1 is a functional block diagram of a liquid crystal display apparatus 10 (i.e. a display apparatus) configuring a multi-image display system according to the first embodiment of the present invention, wherein functional blocks relating to the present embodiment are solely selected in the illustration. The multi-image display system of the present embodiment is formed by vertically aligning or by horizontally and vertically aligning a plurality of liquid crystal display apparatuses 10 shown in FIG. 1.

As shown in FIG. 1, the liquid crystal display apparatus 10 includes an input part 1, an image processing part 2, a display device 3 (i.e. a display part), a CPU (Central Processing Unit) 4 (i.e. a control part), and a power source 5.

The input part 1 inputs image signals. The image processing part 2 reads image signals with the converted frequency, which is m times (where m denotes an integer equal to or above two) higher than the vertical frequency of image signals input via the input part 1, so as to output the read image signals to the display device 2 and display them at the converted frequency. Additionally, the image processing part 2 is able to change the timing to start writing image signals into the display device 3 in the units of periods 1/m times lower than the input period.

The display device 3 (i.e. a display part) is a liquid crystal display device serving as a hold-type device used to hold an image of the displayed frame until an image of the next frame is written and displayed. The display device 3 having multiple lines loads and displays image signals in correspondence with the signals which the image processing part 2 reads at the frequency m times higher than the vertical frequency. That is, the display device 3 loads and displays image signals at the frequency at which the image processing part 2 reads image signals. The CPU 4 sets the frequency which the image processing part 2 uses to reads image signals subject to a signal processing function while setting the image writing start timing. The power source 5 supplies power to various parts.

When an image signal is input to the input part 1 of the liquid crystal display apparatus 10, the input part 1 outputs the input image signal to the image processing part 2. The display device 3 displays an image based on the image signal being input via the video processing part 2.

When carrying out a multi-image display operation with the multi-image display system using a plurality of liquid crystal display devices 10, it is necessary to set a magnification ratio and a display device, used to carry out a multi-image display operation, to the CPU 4 of each liquid crystal display apparatus 10. The CPU 4 determines the setting of the image processing part 2 based on the above setting.

Hereinafter, a multi-image display system is formed by combining two liquid crystal display apparatuses 10 in two stages aligned in a vertical direction, wherein a display operation to be carried out by inputting the same image signal to two liquid crystal display devices 10 will be described below. In this connection, each image signal has a vertical frequency F=60 Hz (hertz) and a period T=16 ms (milliseconds). The display device 3 has 1,080 lines in a vertical direction.

In the following description, the upper-stage liquid crystal display apparatus 10 will be referred to as a liquid crystal display apparatus 10a while the lower-stage liquid crystal display apparatus will be referred to as a liquid crystal display apparatus 10b. A symbol "a" is added to the reference signs with respect to the internal parts of the liquid crystal display apparatus 10a while a symbol "b" is added to the reference signs with respect to the internal parts of the liquid crystal display apparatus 10b.

First, an equal magnification display operation of the multi-image display system of the present embodiment will be described below.

An equal magnification is set to a magnification ratio of the CPU 4a of the liquid crystal display apparatus 10a, serving as the upper stage of the multi-image display system including two liquid crystal display apparatuses 10, in advance. Similarly, an equal magnification is set to a magnification ratio of the CPU 4b of the liquid crystal display apparatus 10b, serving as the lower stage of the multi-image display system including two liquid crystal display apparatuses 10, in advance. Due to the above setting, the CPU 4a of the liquid crystal display apparatus 10a determines the setting regarding a double-speed process, a reading phase difference, and a reading line (i.e. lines 1 to 1,080) with respect to the image processing part 2a, while the CPU 4b of the liquid crystal display apparatus 10b determines the setting regarding a double-speed process, a reading phase difference, and a reading line (i.e. lines 1 to 1,080) with respect to the image processing part 2b.

Figure 2:
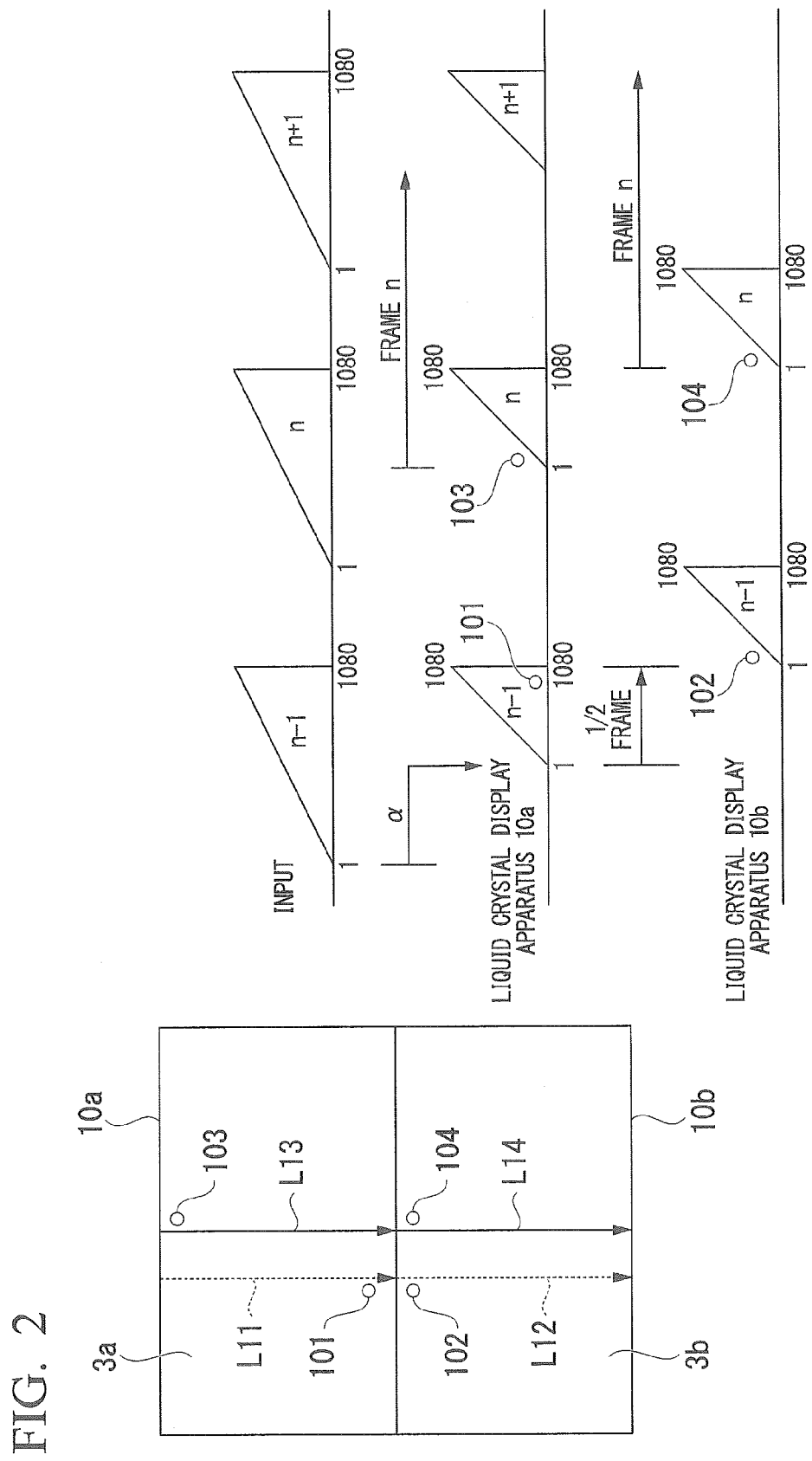
FIG. 2 is a schematic illustration used to show an equal magnification display method in a multi-image display system according to the first embodiment.

FIG. 2 is a schematic illustration used to explain an equal magnification display method of the multi-image display system of the present embodiment.

After the above setting, an image signal is concurrently input to the input part 1a of the liquid crystal display apparatus 10a and the input part 1b of the liquid crystal display apparatus 10b. The input part 1a of the liquid crystal display apparatus 10a outputs the input image signal to the image processing part 2a, and therefore the image processing part 2a sets the double speed of the vertical frequency as the speed of reading the image signal being input via the input part 1a. The image processing part 2a reads an image signal for each frame with a phase difference $\alpha$ ($\alpha > (\frac{1}{2}) \times T$) determined by the CPU 4a subjected to frame synchronization with the CPU 4b of the liquid crystal display apparatus 10b, thus outputting the image signal to the display device 3a. The reason why $\alpha$ is larger than $(\frac{1}{2}) \times T$ is to prevent a frame (n−2) from being read at the display timing of a frame (n−1).

The input part 1b of the liquid crystal display apparatus 10b outputs an image signal, which is concurrently input to the liquid crystal display apparatus 10a, to the image processing part 2b, and therefore the image processing part 2b sets the double speed of the vertical frequency as the speed of reading the image signal being input via the input part 1b. The image processing part 2b reads an image signal for each frame with a phase difference $\alpha+(\frac{1}{2}) \times T$ determined by the CPU 4b subjected to frame synchronization with the CPU 4a of the liquid crystal display apparatus 10a, thus outputting the image signal to the display device 3a.

In FIG. 2, reference sign 101 denotes a write operation to write an image into the lower line of a frame (n−1) in the display device 3a of the liquid crystal display apparatus 10a, while reference sign 102 denotes a write operation to write an image into the upper line of a frame (n−1) in the display device 3b of the liquid crystal display apparatus 10b. Additionally, reference sign 103 denotes a write operation to write an image into the upper line of a frame n in the display device 3a of the liquid crystal display apparatus 10a, while reference sign 104 denotes a write operation to write an image into the upper line of a frame n in the display device 3b of the liquid crystal display apparatus 10b.

As shown in FIG. 2, it takes 8 ms for the display device 3a to write an image of the frame (n−1) of lines 1 to 1,080 onto the screen from the uppermost line to the lowermost line (see a dotted line L11).

In contrast, the display device 3b starts writing an image of lines 1 to 1,080 of the frame (n−1) after $(\frac{1}{2}) \times T = 8$ ms later than the display device 3a starts writing an image of the frame (n−1). Then, it takes 8 ms for the display device 3b to write an image of the frame (n−1) of lines 1 to 1,080 onto the screen from the uppermost line to the lowermost line (see a dotted line L12).

That is, the display device 3b starts writing an image of the frame (n−1) at the position of reference sign 102 (see a dotted line L12) just after the display device 3a of the liquid crystal display apparatus 10a finishes writing an image of the frame (n−1) at the position of reference sign 101 (see a dotted line L11). After the display device 3b finishes writing an image of the frame (n−1), the display device 3a starts writing an image of the frame n, input via the image processing part 2a, at the position of reference sign 103. Just after the display device 3a finishes writing an image of the frame n (see a solid line L13), the display device 3b starts writing an image of the frame n, input via the image processing part 2b, at the position of reference sign 104 (see a solid line L14).

Therefore, it is possible to maintain the continuity between an image displayed in the liquid crystal display apparatus 10a and an image displayed in the liquid crystal display apparatus 10b.

Next, a zoom display operation of the multi-image display system of the present embodiment in a vertical direction will be described below.

A magnification ratio is set to a vertically double zoom with respect to the CPU 4a of the liquid crystal display apparatus 10a, i.e. the upper stage of the multi-image display system including two liquid crystal display apparatuses 10, in advance. Similarly, a magnification ratio is set to a vertically double zoom with respect to the CPU 4b of the liquid crystal display apparatus 10b, i.e. the lower stage of the multi-image display system including two liquid crystal display apparatuses 10, in advance. Thus, the CPU 4a of the liquid crystal display apparatus 10a determines the setting regarding a double-speed process, a reading phase difference, and a reading line (i.e. lines 1 to 540) with respect to the image processing part 2a, while the CPU 4b of the liquid crystal display apparatus 10b determines the setting a double-speed process, a reading phase difference, and a reading line (i.e. lines 541 to 1,080) with respect to the image processing part 2b.

Figure 3:
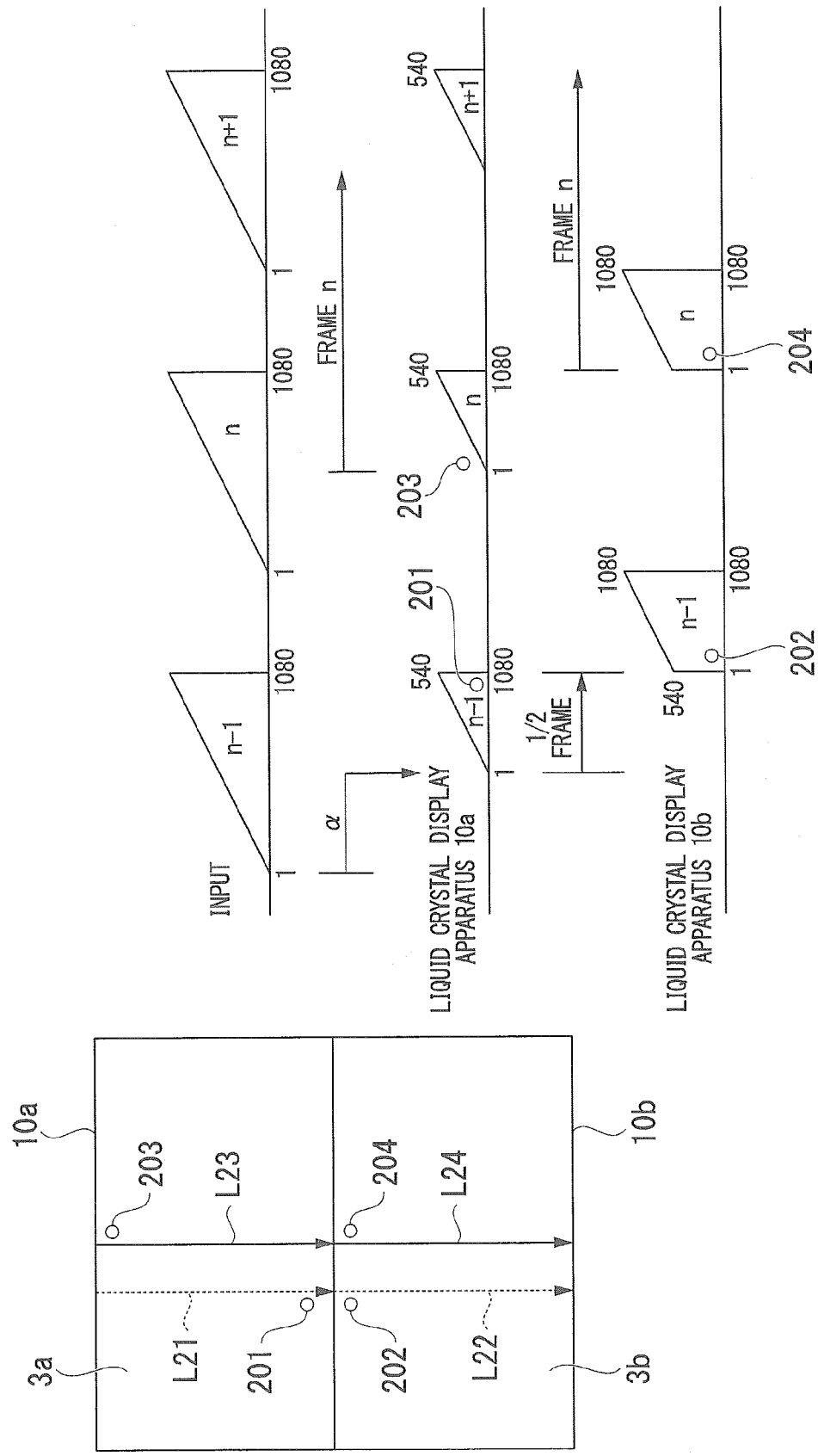
FIG. 3 is a schematic illustration used to show an enlarged display method in a multi-image display system according to the first embodiment.

FIG. 3 is a schematic illustration used to explain an enlarged display method of the multi-image display system of the present embodiment.

In FIG. 3, reference sign 201 denotes an operation of writing an image into the lower line of the frame (n−1) in the display device 3a of the liquid crystal display apparatus 10a, while reference sign 202 denotes an operation of writing an image into the upper line of the frame (n−1) in the display device 3b of the liquid crystal display apparatus 10b. Additionally, reference sign 203 denotes an operation of writing an image into the upper line of the frame n in the display device 3a of the liquid crystal display apparatus 10a, while reference sign 204 denotes an operation of writing an image into the upper line of the frame n in the display device 3b of the liquid crystal display apparatus 10b.

The image processing part 2a of the liquid crystal display apparatus 10a sets the double speed of the vertical frequency as the speed of reading an image signal being input via the input part 1a so as to read an image signal for each frame with a phase difference α ($\alpha > (1/2) \times T$). At this time, a magnification ratio is set to a vertically double zoom in the first stage of the liquid crystal display apparatus 10a, and therefore the image processing part 2a reads an image signal of lines 1 to 540 two times so as to output the image signal to the display device 3a. It takes 8 ms for the display device 3a to write an image of the frame (n−1) of lines 1 to 540 onto the screen from the uppermost line to the lowermost line (see a dotted line L21).

The image processing part 2b of the liquid crystal display apparatus 10b sets the double speed of the vertical frequency as the speed of reading an image signal, being input via the input part 1b, so as to read an image signal for each frame with a phase difference $\alpha + (1/2) \times T$. At this time a magnification ratio is set to a vertically double zoom in the second stage of the liquid crystal display apparatus 10b, and therefore the image processing part 2b reads an image signal of lines 541 to 1,080 two times so as to output the image signal to the display device 3b. It takes 8 ms for the display device 3b to write an image of the frame (n−1) of lines 541 to 1,080 onto the screen from the uppermost line to the lowermost line (see a dotted line L22).

Thus, the display device 3b starts writing an image of the frame (n−1) at the position of reference sign 202 (see a dotted line L22) just after the display device 3a of the liquid crystal display apparatus 10a finishes writing an image of the frame (n−1) at the position of reference sign 201 (see a dotted line L21). After the display device 3b finishes writing an image of the frame (n−1), the display device 3a starts writing an image of lines 1 to 540 of the frame n, being input via the image processing part 2a, at the position of reference sign 203. Just after the display device 3a finishes writing an image of the frame n (see a solid line L23), the display device 3b starts writing an image of lines 541 to 1,080 of the frame n, being input via the image processing part 2b, at the position of reference sign 204 (see a solid line L24).

Therefore, it is possible to maintain the continuity between an image displayed in the liquid crystal display apparatus 10a and an image displayed in the liquid crystal display apparatus 10b in the enlarged display operation.

As described above, when a multi-image display operation is performed using a plurality of liquid crystal display apparatuses which is horizontally and vertically aligned such that m stages of liquid crystal display apparatuses are combined in a vertical direction, each liquid crystal display apparatus carries out a writing operation with the frequency m times higher than the vertical frequency of an input image signal. The writing start timing for each liquid crystal display device is shifted in such a way that, based on the reference timing 0 of the uppermost (or first-stage) liquid crystal display apparatus, the timing of the second-stage liquid crystal display apparatus is shifted by 1/m of the input frequency, the timing of the third-stage liquid crystal display apparatus is shifted by 2/m of the input frequency, and the timing of the m-stage liquid crystal display apparatus is shifted by (m−1)/m. Thus, it is possible to prevent a displacement of an image from occurring between the upper and lower liquid crystal display apparatuses.

[Second Embodiment]

In the liquid crystal display apparatus 10 of the first embodiment, the display device 3 serving as a hold-type device operates in such a way that the display device 3 carries out a writing operation for each frame once. In contrast, the second embodiment is designed to carry out a writing operation for each frame multiple times. Hereinafter, differences between the first and second embodiments will be described in particular.

Figure 4:
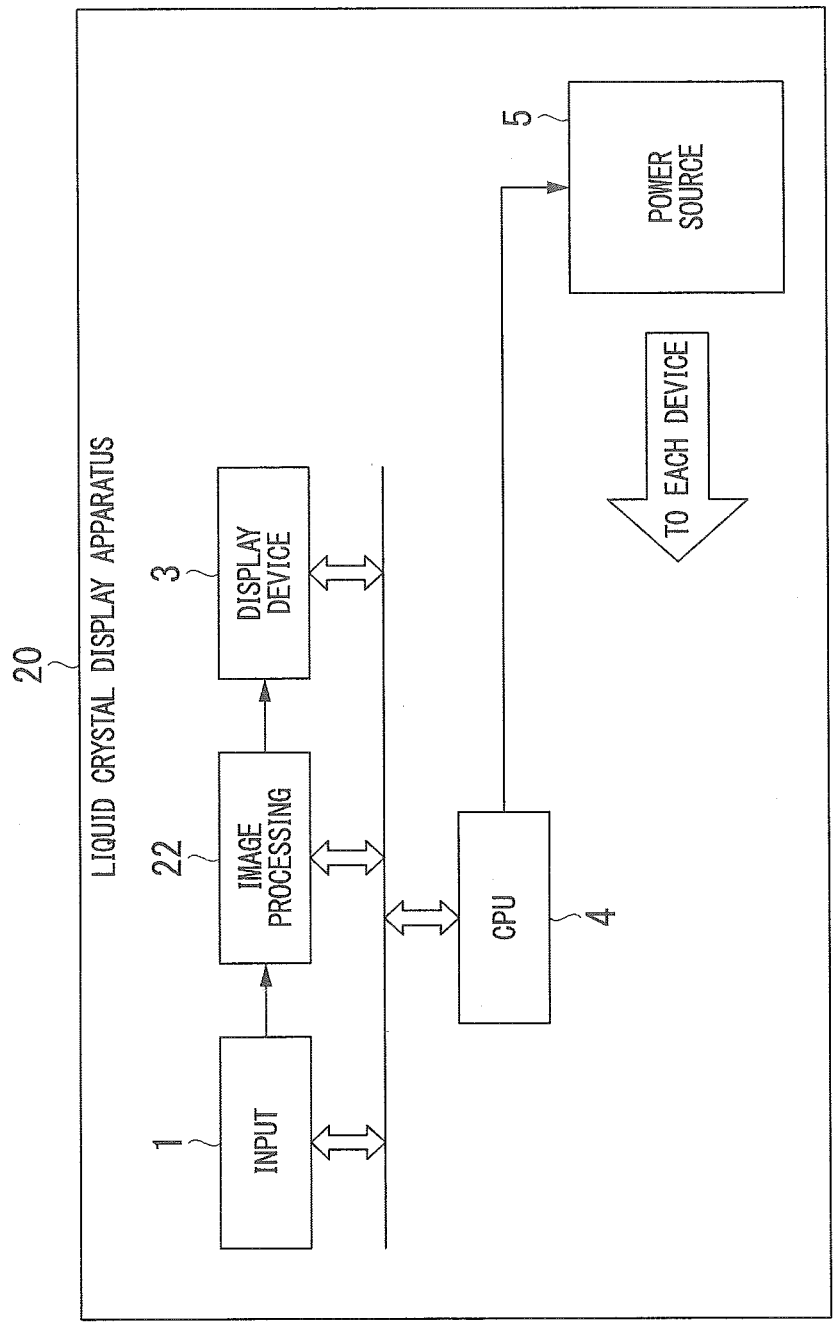
FIG. 4 is a functional block diagram of a liquid crystal display apparatus according to the second embodiment of the present invention.

FIG. 4 is a functional block diagram of a liquid crystal display apparatus 20 forming a multi-image display system of the second embodiment, wherein functional blocks relating to the present embodiment are solely selected in the illustration. In FIG. 4, parts identical to those of the liquid crystal display apparatus 10 of the first embodiment shown in FIG. 1 are denoted using the same reference signs, and therefore the descriptions thereof will be omitted. The liquid crystal display apparatus 20 shown in FIG. 4 differs from the liquid crystal display apparatus 10 of the first embodiment by use of an image processing part 22 substituting for the image processing part 2. The image processing part 22 reads an image signal with the converted frequency, which is m times higher than the vertical frequency of image signals being input via the input part 1, so as to output the read image signal for the same frame of screen with the display device 3 multiple times (maximally m times), thus displaying the read image signal. In this connection, it is unnecessary to use a hold-type device as the display device 3 of the present embodiment.

Hereinafter, a multi-image display system is formed using two liquid crystal display apparatuses 20 combined in two stages in a vertical direction, wherein a display operation using two liquid crystal display apparatuses will be described below. Hereinafter, the upper stage of the liquid crystal display apparatus 20 will be referred to as a liquid crystal display apparatus 20a while the lower stage of the liquid crystal display apparatus 20 will be referred to as a liquid crystal display apparatus 20b. A symbol "a" is added to reference signs with respect to the internal parts of the liquid crystal display apparatus 20a while a symbol "b" is added to reference signs with respect to the liquid crystal display apparatus 20b.

Similar to the first embodiment shown in FIG. 3, the CPU 4 of each liquid crystal display apparatus 20 forming the multi-image display system of the present embodiment determines the setting regarding a double-speed process and a reading phase difference of the image processing part 22 and the setting regarding a magnification ratio. After the setting, image signals, similar to those used in the first embodiment, are concurrently input to the input part 1a of the liquid crystal display apparatus 20a and the input part 1b of the liquid crystal display apparatus 20b. Similar to the first embodiment, images signals have a vertical frequency F=60 Hz and a period T=16 ms.

Figure 5:
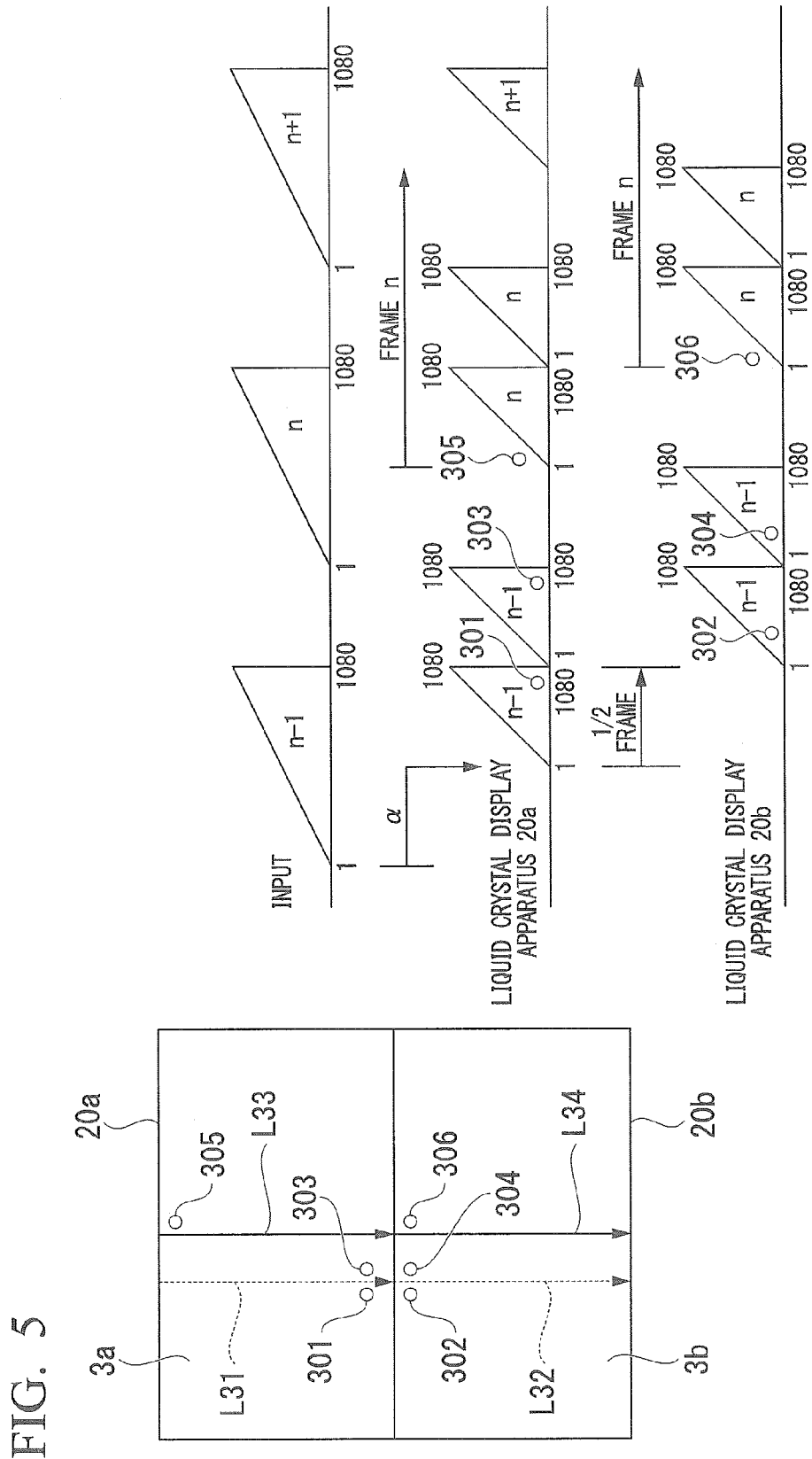
FIG. 5 is a schematic illustration used to show an equal magnification display method in a multi-image display system according to the second embodiment.

FIG. 5 is a schematic illustration used to explain an equal magnification display method of the multi-image display system of the present embodiment.

In FIG. 5, reference signs 301, 303 denote an operation of writing an image into the lower line of a frame (n−1) in the display device 3a of the liquid crystal display apparatus 20a, while reference signs 302, 304 denote an operation of writing an image into the upper line of a frame (n−1) in the display device 3b of the liquid crystal display apparatus 20b. Additionally, reference sign 305 denotes an operation of writing an image into the upper line of a frame n in the display device 3a of the liquid crystal display apparatus 20a, reference sign 306 denotes an operation of writing an image into the upper line of a frame n in the display device 3b of the liquid crystal display apparatus 20b.

The image processing part 22a of the liquid crystal display apparatus 20a sets the double speed of the vertical frequency as the speed of reading an image signal, being input via the input part 1a, so as to read an image signal for each frame of lines 1 to 1,080 with a phase difference $\alpha$ ($\alpha > (1/2) \times T$), thus outputting the image signal to the display device 3a. It takes 8 ms for the display device 3a to write an image of a frame (n−1) of lines 1 to 1,080 onto the screen from the uppermost line to the lowermost line (see a dotted line L31). Subsequently, it takes 8 ms for the display device 3a to write an image of the frame (n−1) of lines 1 to 1,080, being input via the video processing part 22a, onto the screen from the uppermost line to the lowermost line (see a dotted line L31).

The image processing part 22b of the liquid crystal display apparatus 20b sets the double speed of the vertical frequency as the speed of reading an image signal, being input via the input part 1b, so as to read an image signal with a phase difference $\alpha + (1/2) \times T$, thus outputting the image signal to the display device 3b. The display device 3b starts writing an image of a frame (n−1) after $(1/2) \times T = 8$ ms later than the display device 3a starts writing an image of a frame (n−1) for the first time. It takes 8 ms for the display device 3b to write an image of the frame (n−1) of lines 1 to 1,080 onto the screen from the uppermost line to the lowermost line (see a dotted line L32). Subsequently, it takes 8 ms for the display device 3b to write the same image of the frame (n−1), being input via the image processing part 22b, onto the screen from the uppermost line to the lowermost line (see a dotted line L32).

Thus, just after the display device 3a of the liquid crystal display apparatus 20a finishes writing the image of the frame (n−1) for the first time indicated by reference sign 301 (see a dotted line L31), the display device 3b starts writing the image of the frame (n−1) for the first time indicated by reference sign 302. At the same time, the image processing part 22a of the liquid crystal display apparatus 20a outputs the image of the frame (n−1) to the display device 3a again for the same frame of screen, and therefore the display device 3a starts writing the image of the frame (n−1). Just after the display device 3a finishes writing the image of the frame (n−1) at the position of reference sign 303 (see a dotted line L31), the image processing part 22b of the liquid crystal display apparatus 20b outputs the image of the frame (n−1) to the display device 3b again. The display device 3b restarts writing the image of the frame (n−1) at the position of reference sign 304 (see a dotted line L32).

After the display device 3b finishes writing the image of the frame (n−1) for the second time, both the liquid crystal display apparatus 20a and the liquid crystal display apparatus 20b carry out a writing operation of a frame (n−1) similar to the writing operation of the frame (n−1). That is, the display device 3a of the liquid crystal display apparatus 20a starts writing an image of a frame n at the position of reference sign 305. Just after the display device 3a finishes writing the image of the frame n (see a solid line L33), the display device 3b of the liquid crystal display apparatus 20b starts writing the image of the frame n at the position of reference sign 306 (see a solid line L34).

Figure 6:
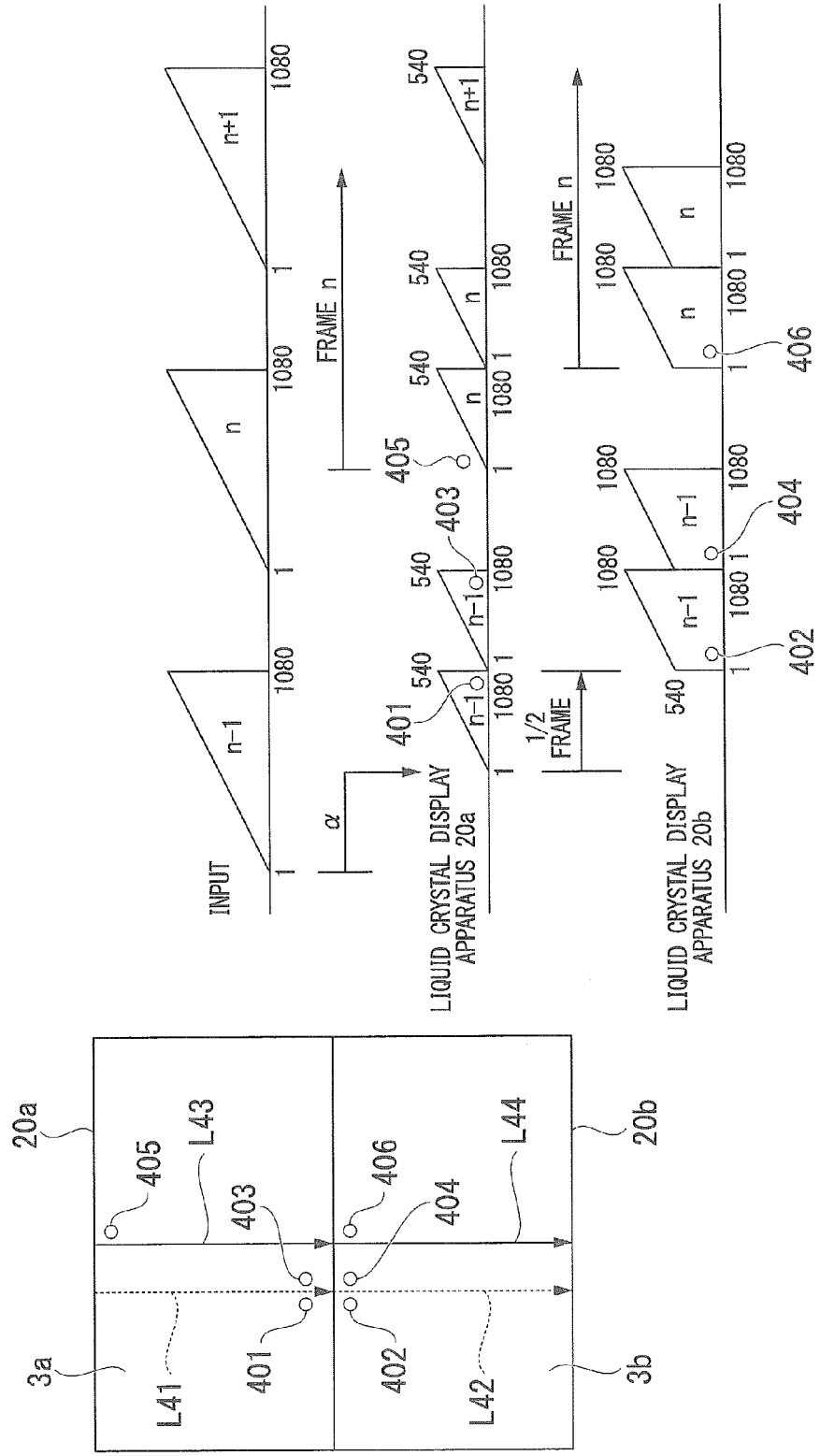
FIG. 6 is a schematic illustration used to show an enlarged display method in a multi-image display system according to the second embodiment.
Figure 7:
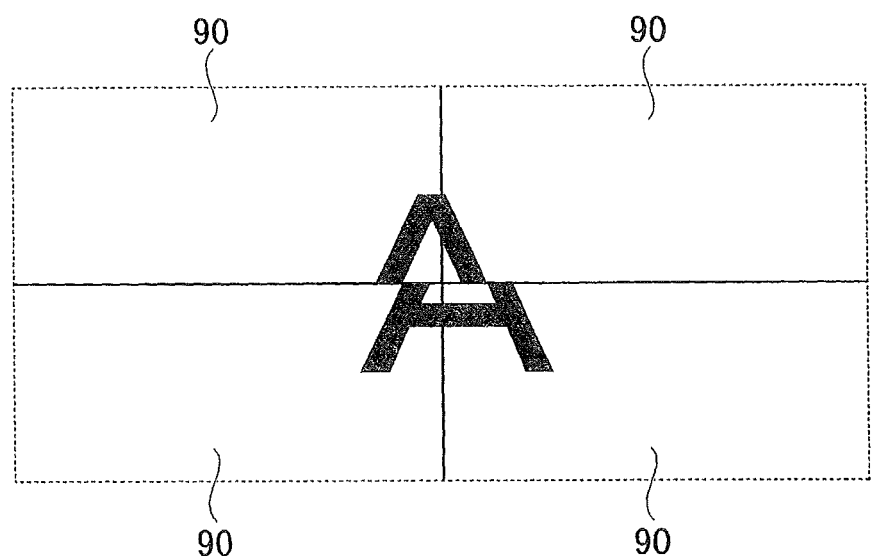
FIG. 7 is a schematic illustration showing an image displayed in the conventional multi-image display system.
Figure 8:
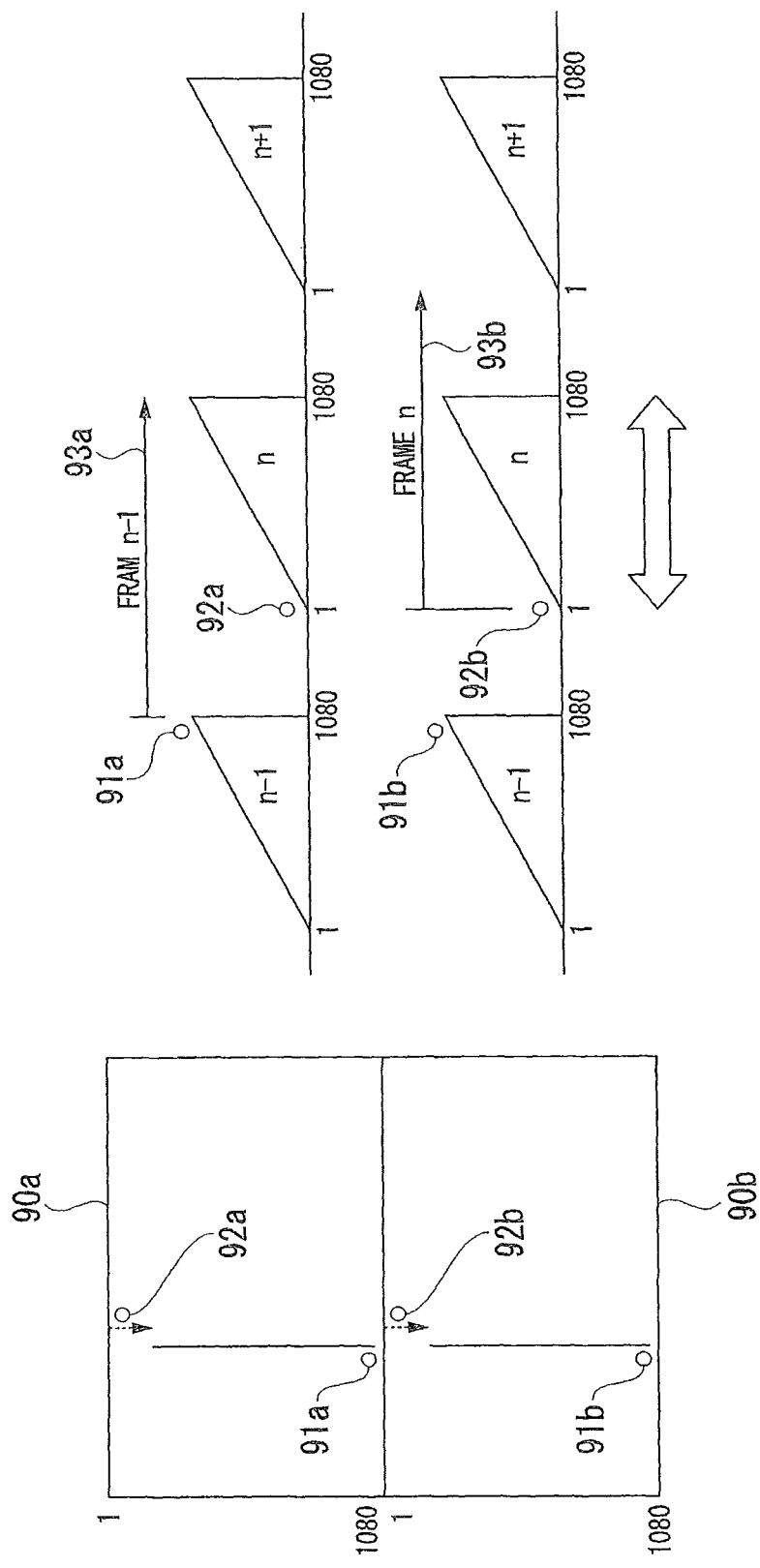
FIG. 8 is a schematic illustration used to explain the principle regarding the occurrence of displacements of images in the conventional multi-image display system.

FIG. 6 is a schematic illustration used to explain an enlarged display method of the multi-image display system of the present embodiment. Herein, a magnification ratio is set to a vertically double zoom.

In FIG. 6, reference signs 401, 403 denote an operation of writing an image into the lower line of a frame (n−1) in the display device 3a of the liquid crystal display apparatus 20a, while reference signs 402, 404 denote an operation of writing an image into the upper line of a frame (n−1) in the display device 3b of the liquid crystal display apparatus 20b. Additionally, reference sign 405 denotes an operation of writing an image into the upper line of a frame n in the display device 3a of the liquid crystal display apparatus 20a, while reference sign 406 denotes an operation of writing an image into the upper line of a frame n in the display device 3b of the liquid crystal display apparatus 20b.

The image processing part 22a of the liquid crystal display apparatus 20a sets the double speed of the vertical frequency as the speed of reading an image signal being input via the input part 1a so as to read an image signal for each frame with a phase difference $\alpha$ ($\alpha > (1/2) \times T$), thus outputting the image signal to the display device 3a. At this time, the image processing part 22a reads an image of lines 1 to 540 two times. It takes 8 ms for the display device 3a to write an image of a frame (n−1) of lines 1 to 540 onto the screen from the uppermost line to the lowermost line (see a dotted line L41). Subsequently, it takes 8 ms for the display device 3a to write an image of the frame (n−1) of lines 1 to 540, being input via the image processing part 22a, onto the screen from the uppermost line to the lowermost line (see a dotted line L41).

The image processing part 22b of the liquid crystal display apparatus 20b sets the double speed of the vertical frequency as the speed of reading an image signal being input via the input part 1b so as to read an image signal for each frame with a phase difference $\alpha + (1/2) \times T$, thus outputting the image signal to the display device 3b. At this time, the image processing part 22b reads an image signal of lines 541 to 1,080 two times. The display device 3b starts writing an image of a frame (n−1) after $(1/2) \times T = 8$ ms later than the display device 3a starts writing an image of a frame (n−1) for the first time. It takes 8 ms for the display device 3b to write an image of a frame (n−1) of lines 541 to 1,080 onto the screen from the uppermost line to the lowermost line (see a dotted line L42). Subsequently, it takes 8 ms for the display device 3b to write an image of the frame (n−1) of lines 541 to 1,080, being input via the image processing part 22b, onto the screen from the uppermost line to the lowermost line (see a dotted line L42).

As described above, the display device 3b starts writing an image of the frame (n−1) at the position of reference sign 402 for the first time just after the display device 3a of the liquid crystal display apparatus 20a finishes writing an image of the frame (n−1) for the first time at the position of reference sign 401 (see a dotted line L41). At the same time, the image processing part 22a of the liquid crystal display apparatus 20a outputs an image of the frame (n−1) again to the display device 3b for the same frame of screen, and therefore the display device 3b starts writing an image of the frame (n−1). Just after the display device 3a finishes writing an image of the frame (n−1) at the position of reference sign 403 (see a solid line L43), the image processing part 22b of the liquid crystal display apparatus 20b outputs an image of the frame (n−1) again to the display device 3b. The display device 3b starts writing an image of the frame (n−1) again at the position of reference sign 404 (see a solid line L44).

The liquid crystal display apparatus 20a carries out a writing operation of the frame n (see a solid line L43) in a similar manner as the liquid crystal display apparatus 20a carries out a writing operation of the frame n in FIG. 5 (see a solid line L33), while the liquid crystal display apparatus 20b carries out a writing operation of the frame n (see a solid line L44) in a similar manner as the liquid crystal display apparatus 20b carries out a writing operation of the frame n in FIG. 5 (see a solid line L34). Thus, the image display timings of reference signs 405, 406 are similar to the image display timings of reference signs 305, 306 shown in FIG. 5. Herein, the liquid crystal display apparatus 20a displays an image of lines 1 to 540 being read from an image signal, while the liquid crystal display apparatus 20b displays an image of lines 541 to 1,080 being read from an image signal.

As described above, it is possible to obtain a similar effect to the first embodiment even when the liquid crystal display apparatus 20 carries out a writing operation for each frame with the display devices 3.

As described above, the CPU 4 of each liquid crystal display device 10 configuring a multi-image display system is set with m (where m is an integer equal to or higher than two), representing a ratio of vertically magnifying an image, and n (where n is an integer equal to or above one and equal to or below m) representing the location of the stage counted from the uppermost stage. The CPU 4 sets the write frequency, which is m times higher than the input frequency of an image signal, and display timing, which is shifted from the first stage of the liquid crystal display apparatus 10 by ((n−1)/m)×T (where T denotes the input frequency of an image signal), to the image processing part 2. Thus, the image processing part 2 reads an image to be displayed on the corresponding apparatus from an image signal at the read frequency identical to the write frequency, thus displaying the read image at the write frequency.

Therefore, it is possible to prevent a displacement of images between display apparatuses when displaying a moving image in the multi-image display system carrying out a multi-image display operation using a plurality of display apparatuses.

It is possible to append the following supplementary notes, which are not restrictive, to part of or the entirety of the foregoing embodiments.

(Supplementary Note 1)

A display apparatus forming a multi-image display system is characterized by comprising: a display part having a plurality of lines, which writes and displays an image via lines; a control part which determines a write speed of an image signal based on the number of display apparatuses aligned in a vertical direction with respect to the lines forming the display part in the multi-image display system; and an image signal processing part which shifts the write start timing based on the location of the corresponding apparatus within the display apparatuses being aligned in a vertical direction so as to display a display image of the corresponding apparatus, being read from an image signal, on the display part.

(Supplementary Note 2)

The display apparatus according to Supplementary Note 1 is characterized in that m denotes the number of display apparatuses being aligned in a vertical direction while n (where n≤m) denotes the location of the corresponding apparatus within m display apparatuses, wherein the image signal processing part determines a write speed by multiplying the vertical frequency of an image signal by a factor of m, and wherein the image signal processing part shifts the write start timing of the corresponding apparatus by a ((n−1)/m) fragment of the input period of an image signal from the write start timing of a first display apparatus in a vertical direction.

(Supplementary Note 3)

The display apparatus according to Supplementary Note 1 or Supplementary Note 2 is characterized in that the image signal processing part sequentially displays a display image of the corresponding apparatus multiple times on the display part.

(Supplementary Note 4)

A multi-image display system including a plurality of display apparatuses is characterized in that each of the display apparatuses includes a display part having a plurality of lines which writes and displays an image via lines; a control part which determines a write speed of an image signal based on the number of display apparatuses being aligned in a vertical direction with respect to the lines forming the display part in the multi-image display system; and an image signal processing part which shifts the write start timing based on the location of the corresponding apparatus within display apparatuses being aligned in a vertical direction so as to display a display image of the corresponding apparatus, being read from an image signal, on the display part at the write speed.

(Supplementary Note 5)

A display control method for a display apparatus having a display part, used to write an image via a plurality of lines, and forming a multi-image display system is characterized by comprising: a speed determination step configured to determine a write speed of an image signal based on the number of display apparatuses being aligned in a vertical direction with respect to the lines forming the display part in the multi-image display system; and a write process step configured to shift the write start timing based on the location of the corresponding apparatus within display apparatuses being aligned in a vertical direction so as to display a display image of the corresponding apparatus, being read from an image signal, on the display part at the write speed determined by the speed determination step.

(Supplementary Note 6)

A display control method for a multi-image display system including a plurality of display apparatuses each equipped with a display part which writes and displays an image via a plurality of lines is characterized in that each of the display apparatuses implements a speed determination step configured to determine a write speed of an image signal based on the number of display apparatuses being aligned in a vertical direction with respect to the lines forming the display part in the multi-image display system, and a write process step configured to shift the write start timing based on the location of the corresponding apparatus within display apparatuses being aligned in a vertical direction so as to display a display image of the corresponding apparatus, being read from an image signal, on the display part at the write speed determined by the speed determination step.

REFERENCE SIGNS LIST 10, 10a, 10b, 20, 20a, 20b, 90, 90a, 90b . . . liquid crystal display apparatus (or display apparatus)
1 . . . input part
2, 22 . . . image processing part
3, 3a, 3b . . . display device (or display part)

4 ... CPU (or control part)
5 ... power source

The invention claimed is:

1. A display apparatus forming a portion of a multi-image display system, comprising:
   a display part configured to display an image at a specific vertical frequency corresponding to a vertical frequency of an image signal multiplied by a number of display apparatuses aligned in a vertical direction; and
   an image signal processing part configured to shift a start timing of writing the image signal into the display part based on a location of the display apparatus within display apparatuses being aligned in the vertical direction to form the multi-image display system,
   wherein m denotes a number of display apparatuses being aligned in the vertical direction,
   wherein, based on a reference timing 0 of a first-stage display apparatus, a timing of a second-stage display apparatus is shifted by 1/m of the specific vertical frequency.

2. The display apparatus according to claim 1, wherein m denotes the number of display apparatuses being aligned in the vertical direction in the multi-image display system while n (where n≤m) denotes the location of the corresponding display apparatus within the m display apparatuses,
   wherein the specific vertical frequency comprises the vertical frequency multiplied by a factor of m, and
   wherein the image signal processing part shifts a start timing from the start timing of a first display apparatus of the multi-image display system in the vertical direction by a ((n−1)/m) fragment of an input period of the image signal.

3. The display apparatus according to claim 1, wherein the image signal processing part sequentially displays the image of the corresponding display apparatus multiple times on the display part.

4. A multi-image display system including a plurality of display apparatuses, wherein each of the display apparatuses includes:
   a display part configured to display an image at a specific vertical frequency corresponding to a vertical frequency of an image signal multiplied by a number of display apparatuses aligned in a vertical direction, and
   an image signal processing part configured to shift a start timing of writing the image signal into the display part based on a location of the display apparatus within display apparatuses being aligned in the vertical direction to form the multi-image display system,
   wherein m denotes a number of display apparatuses being aligned in the vertical direction,
   wherein, based on a reference timing 0 of a first-stage display apparatus, a timing of a second-stage display apparatus is shifted by 1/m of the specific vertical frequency.

5. A display control method for a display apparatus having a display part configured to display an image at a specific vertical frequency corresponding to a vertical frequency of an image signal multiplied by a number of display apparatuses aligned in a vertical direction and forming a multi-image display system, said method comprising:
   shifting a start timing of writing the image signal into the display part based on a location of a display apparatus within display apparatuses being aligned in the vertical direction to form the multi-image display system,
   wherein m denotes a number of display apparatuses being aligned in the vertical direction,
   wherein, based on a reference timing 0 of a first-stage display apparatus, further shifting a timing of a second-stage display apparatus by 1/m of the specific vertical frequency.

6. The display apparatus according to claim 1, wherein the display apparatuses aligned in the vertical direction synchronize with each other so as to determine a phase difference, and
   wherein an uppermost display apparatus is delayed in displaying the image for each frame by the phase difference.

7. The multi-image display system according to claim 4, wherein the display apparatuses aligned in the vertical direction synchronize with each other so as to determine a phase difference, and
   wherein an uppermost display apparatus is delayed in displaying the image for each frame by the phase difference.

8. The display control method for a display apparatus according to claim 5, wherein the display apparatuses aligned in the vertical direction synchronize with each other so as to determine a phase difference, and
   wherein an uppermost display apparatus is delayed in displaying the image for each frame by the phase difference.

9. The display apparatus according to claim 1,
   wherein the start timing of writing the image signal into the display part is shifted in such a way that a timing of an m-stage display apparatus is shifted by (m−1)/m of the specific vertical frequency.

10. The display apparatus according to claim 1, wherein the start timing of writing the image signal into the display part is shifted based on a number of display apparatuses being aligned in the vertical direction and the specific vertical frequency.

11. The display apparatus according to claim 1, wherein immediately after the image signal processing part of a first display apparatus completes writing the image into the display part, the image signal processing part of a second display apparatus starts the writing the image signal into the display part.

12. The display apparatus according to claim 1, wherein a display apparatus of the display apparatuses is delayed in displaying the image for each frame so as to limit a displacement of images between the display apparatuses.

13. The display apparatus according to claim 1, wherein the display of the display part is adjusted in a display apparatus of the display apparatuses so as to limit a displacement of images between the display apparatuses.

14. The display apparatus according to claim 1, wherein the image signal processing part adjusts the display of the display part of a display apparatus of the display apparatuses so as to limit a displacement of images between the display apparatuses.

* * * * *